March 2, 1971   F. A. DE PUYDT ET AL   3,567,253
VEHICLE COUPLER UNIT
Filed June 13, 1969
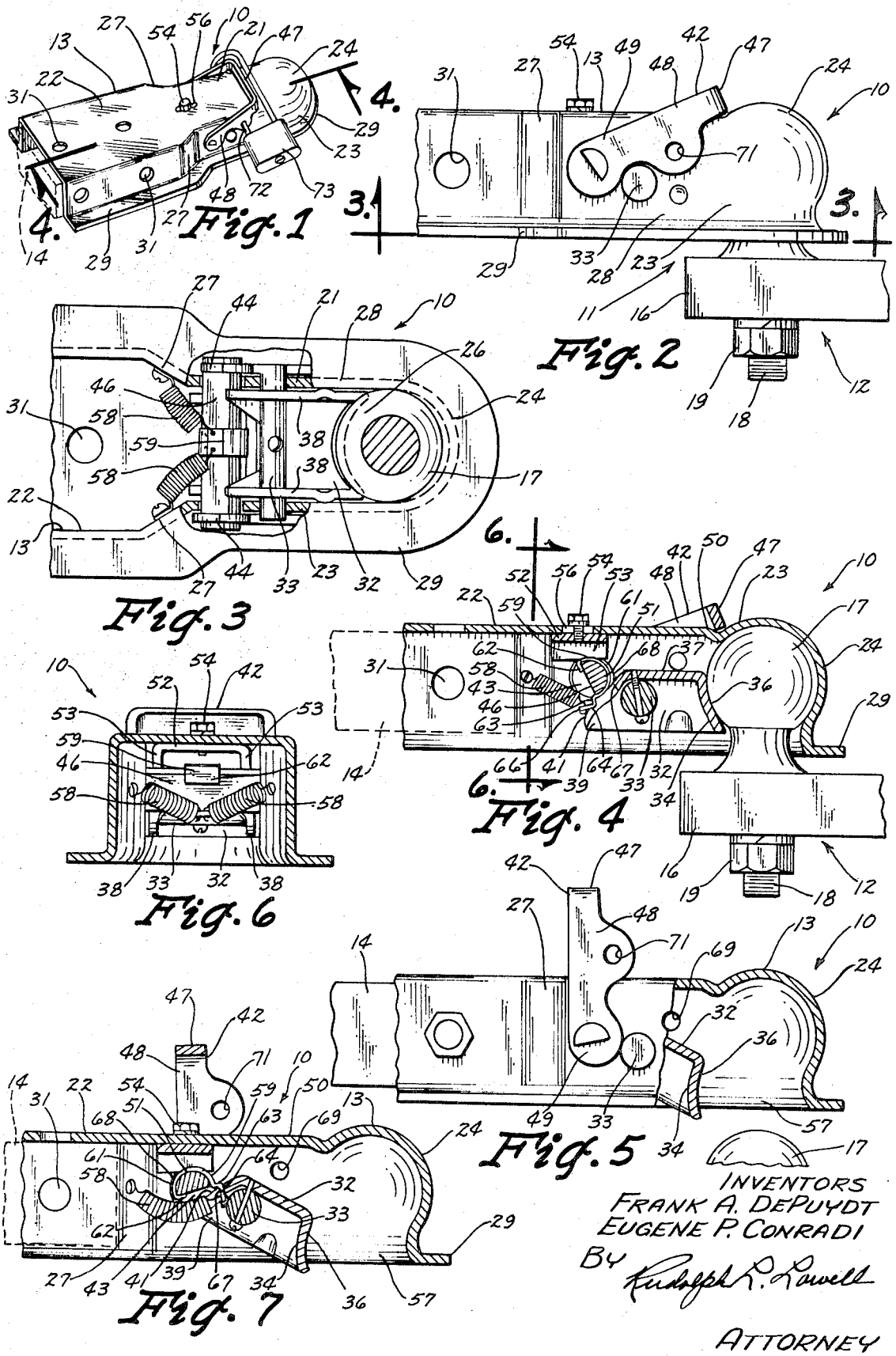
INVENTORS
FRANK A. DePUYDT
EUGENE P. CONRADI
BY Rudolph L. Lowell
ATTORNEY

United States Patent Office 3,567,253
Patented Mar. 2, 1971

3,567,253
VEHICLE COUPLER UNIT
Frank A. De Puydt and Eugene P. Conradi, Des Moines, Iowa, assignors to Dico Company, Inc., Des Moines, Iowa
Filed June 13, 1969, Ser. No. 832,949
Int. Cl. B60d 1/06
U.S. Cl. 280—512                                   7 Claims

ABSTRACT OF THE DISCLOSURE

The vehicle coupler unit includes a housing that is formed at one end with a ball-receiving socket and is attachable at its opposite end to a vehicle to be towed. A ball member on the towing vehicle is retained within the socket by a locking member that is pivotally mounted within the housing for movement between coupling and uncoupling positions. A cam member engageable with the locking member is manually actuated in one direction to provide for a movement of the locking member to an uncoupling position and is constantly spring urged in an opposite direction to engage and move the locking member to a coupling position.

SUMMARY OF THE INVENTION

The coupler unit is of a compact construction capable of quickly and positively coupling a towed vehicle with a towing vehicle. A manually operated handle is rigidly secured to the cam member and on movement from a rest position to an actuated position disengages the cam member from the locking member to provide for movement of the locking member to an uncoupling position. The movement of the handle to the actuated position is resisted by springs acting on the cam member to engage and move the locking member to a coupling position. When the handle is in the actuated position, the cam member has a portion engageable with the locking member to prevent movement thereof to the coupling position therefor. The coupling position of the locking member is thus retained so long as the handle is manually retained in its actuated position. Should the ball member, therefore, during a vehicle coupling operation engage and tend to move the locking member toward a coupling position prior to the reception of the ball member within the socket portion of the coupler unit, such misalignment of the ball member is indicated by the resultant increase in pressure applied on the handle counter to the manually applied pressure. Additionally, the arrangement of the handle in the rest position therefor relative to the housing of the coupler unit substantially eliminates the handle being accidentally engaged and moved toward its actuated position.

BRIEF DESCRIPTION OF THE DRAWING

Referring to the drawing,
FIG. 1 is a top perspective view of the coupler unit of this invention;
FIG. 2 is an enlarged foreshortened side elevational view of the coupler unit shown in a coupled relation with the ball member on a towing vehicle;
FIG. 3 is a bottom plan view of the coupler unit as seen along the line 3—3 of FIG. 2;
FIG. 4 is an enlarged sectional view taken along the line 4—4 of FIG. 1 showing the coupler unit in a coupled relation with the ball member;
FIG. 5 is illustrated similarly to FIG. 2 and shows the coupling unit in an uncoupled relation, with certain parts being broken away for the purpose of clarity;
FIG. 6 is a sectional view as seen on the line 6—6 in FIG. 4; and
FIG. 7 is a detail sectional view illustrated similarly to FIG. 4 showing the parts thereof in changed positions.

DESCRIPTION OF THE PREFERRED EMBODIMENT

With reference to the drawing, the coupler unit of this invention, indicated generally as 10 in FIGS. 1 and 2, is illustrated as forming part of a coupling assembly 11 that additionally includes a ball coupler unit 12 of a conventional type. The coupler unit 10 has a housing member 13 adapted for mounting on the tongue 14 of a towed vehicle or trailer (not shown) and the ball coupler unit 12 has a draw bar 16 suitably secured to the rear end portion of the towing or tractor vehicle (not shown). The coupling assembly 11 is thus comprised of the coupler unit or socket connector 10 and the ball coupler unit or connector 12 which is connectable and disconnectable relative to the socket connector 10. The ball connector has a ball member 17 carried on a bolt 18 provided with a nut 19 by which the ball member 17 is rigidly secured to the draw bar 16.

The housing member 13 (FIGS. 1 and 3) of the coupler unit 10 has a body 21 of a generally inverted channel shape provided with an enlarged rear section 22 and a front section 23 formed at its forward end with a dome shaped socket portion 24 the rear side of which is open as indicated at 26 in FIG. 3. The junction of the rear and front sections 22 and 23, respectively, of the housing member 13 is defined by inclined side walls 27 which constitute shoulders that project outwardly from the rear ends of the side walls 28 of the housing member front section 23. Projected laterally from the lower side of the housing member 13 is a reinforcing flange 29.

The trailer tongue 14 is receivable within the housing member rear section 22 for attachment thereto as by bolts (not shown) extended through the tongue 14 and holes 31 formed in the side walls of the housing rear section 22.

The socket portion 24 of the housing member 13 conforms to the peripheral surface of the ball member 17 to provide a bearing seat for the ball member when the coupler units 10 and 12 are in a coupling relation. The ball member 17 is held in a seated relation within the socket portion 24, to maintain the coupling assembly 11 against separation, by a locking member 32 (FIGS. 4 and 6) located within the housing front section 23 and rigidly mounted on a pivot pin 33 that extends between and is rotatably supported on the housing front section side walls 28.

As shown in FIGS. 4 and 6 the locking member 32 is of a generally inverted channel shape and extends longitudinally of the housing member 13. The locking member is formed at its front end 34 with a ball engaging surface 36 of a curvilinear shape. The surface 36, when the locking member 32 is in a horizontal coupling position, is located within the open side 26 of the socket portion 24 in peripheral conformance with the ball seating surface of the housing socket portion 24.

Projected rearwardly and inclined downwardly from the web or top section 37 of the locking member 32 so as to form a rear extension on each leg section 38 of the locking member is a cam member 39 the upper inclined surface 41 of which constitutes a cam surface. The pivot pin 33 extends transversely of the locking member 32 and through the leg sections 38 at a position adjacent the cam surfaces 41 so that the locking member front end 34 may have a downward gravity movement from a coupling position shown in FIG. 4 to its lowered uncoupling position shown in FIG. 5.

When the locking member 32 is in the coupling position of FIG. 4, the front surface 36 thereof co-operates with the socket portion 24 of the housing member 13 to form a ball receiving socket area in which the ball member 17 is free to turn as in a universal joint. When the locking member is pivoted downwardly from the front wall of the socket portion 24 to its uncoupling position in FIG. 5 the ball member 17 may be moved into and out of the socket space or area.

The locking member 32 is adapted to be actuated between the coupling and uncoupling position therefor by an actuating mechanism which includes a handle 42 and a cam means 43 that is arranged for operative association with the cam surfaces 41. The cam means 43 comprises a cylindrical cam shaft which extends between and is rotatably supported on the side walls 28 of the housing front section 23 forwardly of the housing shoulders 27 and in a parallel relation with the pivot pin 33. The opposite ends 44 of the cam shaft 43 project outwardly of the side walls 28 and within the housing member 13 the central portion of the cam shaft 43 is cut away to form a flat or low cam surface 46 extended substantially diametrically of the cam shaft and of a length greater than the spacing between the cam surfaces 41 axially of the cam shaft.

The handle 42 is formed of a flat strap material bent into a U-shape to form a hand grip or base section 47 and leg sections 48 (FIGS. 4 and 5). With the hand grip 47 uppermost the leg sections 48 are arranged in a straddling relation relative to the housing member 13 with their free or terminal ends 49 rigidly secured to corresponding ends 44 of the cam shaft 43. When the locking member 32 is in its coupling position shown in FIG. 4 the handle 42 is in a rest position inclined upwardly and forwardly from the cam shaft 43 with the hand grip 47 in abutting engagement with the top wall 50 of the housing member 13 at a position adjacent the socket portion 24. When the locking member 32 is in its uncoupling position shown in FIGS. 5 and 7 the handle 42 is in an actuated position with the leg sections 48 projected substantially vertically upwardly from the housing member. This actuated position of the handle 42 is defined by the engagement of the leg sections 48 with the shoulders 27 on the housing member.

Referring to FIG. 4, it is seen that the high side or surface 51 of the cam shaft 43 opposite the low or flat side surface 46 is at the forward side of the cam shaft 43 for engagement with the cam surfaces 41 on the locking member 32 at a position adjacent one edge of the low cam side 46. Adjacent the opposite edge of the cam low side 46 the cam high side 51 is engageable with an adjustable abutment member 52 (FIGS. 4 and 6) of an inverted channel shape having a web section positioned flat against the underside of the top wall 50 of the housing member 13. The lower surfaces of the leg sections 53 of the abutment member 52 are inclined upwardly and forwardly. A clamping screw 54 positioned through a slot 56 extended longitudinally of the housing member top wall 50 is threadable within the web section for clamping the abutment member 52 in an adjusted position against the housing member top wall.

With the cam shaft high side 51 engaged with the locking member 32, as shown in FIG. 4, the abutment member 52 is adjusted longitudinally of the housing member 13 until the lower surfaces of the legs 53 thereof are in contact engagement with the cam shaft high side 51. Any tendency of the ball member 17 to pivot the locking member 32 toward its uncoupling position in FIG. 5 is thus positively prevented by the abutting engagement of oppositie portions of the cam shaft high side 51 with the abutment member 52 and cam surfaces 41. It will also be appreciated that as a result of this reacting abutting engagement the locking member 32 is held in its coupling position against rattling movement.

To release the locking member 32 for movement from the coupling position in FIG. 4 to its uncoupling position shown in FIGS. 5 and 7 the handle 42 is manually moved from its rest position in FIG. 4 to its actuated position in FIG. 5. This handle movement provides for the rotation of the cam shaft 43 in a counterclockwise direction, as viewed in FIGS. 4 and 7, so as to move the high side 51 of the cam shaft out of engagement with the cam surfaces 41 of the locking member 32 and the low side 46 of the cam shaft opposite the cam surfaces 41. By virtue of the location of the pivot pin 33 adjacent to the cam surfaces 41 the forward end 34 of the locking member may move downwardly by gravity action so that the mouth 57 of the socket receiving area is enlarged, as shown in FIG. 5, to permit release of the ball member 17 from the socket connector 10. This uncoupling position of the locking member 32 is defined by the engagement of the cam surfaces 41 (FIG. 7) with the low side 46 of the cam shaft 43.

The movement of the handle 42 from the rest position to the actuated position therefore is resisted by torsion springs 58 illustrated as coil springs, each of which is connected at one end to the housing member 13 and at its opopsite end to a clip member 59 attached to the cam shaft 43 at a position between the cam surfaces 41 of the locking member 32. The clip member 59 (FIGS. 4 and 7) has a curved body portion 61 conforming to and extended over a part of the cam high side 51 with one end 62 hooked against the cam low side 46. The other end of the clip member 59 terminates in an angulate extension 63 that has a section 64 projected generally radially outwardly of the cam shaft 43 and a terminal section 66 extended transversely of the cam shaft 43 in a direction away from low cam side 46.

On movement of the handle 42 from the rest position to the actuated position therefor gravity movement of the locking member 32 to its uncoupling position may take place independently of any engagement with the section 64 of the clip member 59. However, as clearly appears in FIG. 7 the section 64 is in abutting engagement with the rear edge 67 of the web section 37. Thus the locking member 32 may be either gravity or cam actuated to the uncoupling position. It is further seen that the springs 58 through the handle leg sections 48 act to continuously bias the handle 42 from its actuated position toward its rest position. The locking member 32 is thus retained in its uncoupling position so long as manual pressure is applied on the handle in the actuated position therefor.

It will be noted that the biasing action of the springs 58 tend to rotate the cam shaft 43 in a clockwise direction as viewed in FIG. 7 so as to move the high side 51 of the cam shaft into engagement with the cam surfaces 41. On release of the handle 42, therefore, the locking member 32 is moved from its uncoupling position to a coupling position by the riding action of the cam shaft high side 51 on the cam surfaces 41 and with the coupling position being defined by the engagement of the handle base section 47 with the housing top wall 50.

To re-establish connection of the ball member 17 with the socket connector 10 the handle 42 is moved from the rest position to its actuated position to open the mouth 57 of the socket area in the housing member 13 (FIG. 5). With the handle 42 manually retained in the actuated position and the ball 10 moved into the socket area, the springs 58, on release of the handle 42, act to concurrently move the handle to its rest position and the locking member 32 to a coupling position. The resulting abutting reaction between the cam surfaces 41, cam shaft 43 and adjustment member 52 along with the biasing action of the springs 58 to constantly urge the locking member 32 to its coupling position, provides for the locking member being positively held in a coupling position against rattling movement.

Should the ball member 17, in the connecting thereof with the coupler unit 10, be out of alignment with the mouth opening 57 so as to become engageable with the front end 34 of the locking plate 32, such misalignment is directly indicated to the operator by an increase in the manual pressure required to hold the handle in its actuated position. Thus, any movement of the locking member 32 toward the coupling position therefor is resisted by the engagement of the clip section 64 with the web section rear edge 67 so as to complement the biasing action of the springs 58 tending to move the handle toward its rest position. As a result of the misaligned ball member 17 acting on the front end 34 of the locking member to increase the manual holding pressure on the handle, such misalignment is indicated to the operator so that it can be corrected prior to any release of the handle 42.

In order to insrue a free rotation of the cam shaft 43 relative to the cam surfaces 41 and adjustment member 52 the openings 68 (FIG. 4) in the housing front section side walls 28 for receiving the cam shaft 43 are of an enlarged size relative to the diameter of the cam shaft. The cam shaft 43 during rotation thereof is thus permitted limited lateral movement relative to its axis of rotation while providing for a positive engagement of the high side 51 with the cam surfaces 41.

As a result of this construction the machining tolerances are not critical and are compensated for by the adjustment member 52 which is also adjustable to compensate for any wear on the locking member 32 and the cam shaft 43. Also, and as best appears in FIGS. 3 and 4, the handle 42 in its rest position, has the hand grip 47 and leg sections 48 thereof in a substantial nesting relation with the housing member 13. This relation of the handle 42 and housing member 13 gives an overall streamlined appearance to the coupler unit 10 and practically eliminates the handle 42 from being moved toward its actuated position as the result of an accidental abutting engagement with any portion thereof.

To preclude any unauthorized disconnection of the coupler unit 12 and ball member 17, the side walls 28 of the housing member 13 are formed with transversely opposite openings 69 which are aligned with openings 71 in the handle leg sections 48 (FIG. 5) when the handle 42 is in its rest position shown in FIGS. 1 and 2. A hasp 72 of a padlock 73 inserted through the aligned openings positively locks the handle 42 to the housing member 13.

We claim:

1. A coupler unit for effecting a connection between a towed vehicle and a towing vehicle having a ball member, comprising:
   (a) a housing member,
   (b) a pivoted locking member,
   (c) pivot means on said housing pivotally supporting the locking member within the housing member for pivotal movement to a coupling position wherein one end thereof forms a ball socket in co-operation with a socket portion of the housing member and to an uncoupling position wherein the mouth of the socket is enlarged to receive the ball member for entry into and removal from the socket,
   (d) a cam surface on the opposite end of said locking member,
   (e) cam means rotatably supported within the housing member having a high side engageable with said cam surface and a low side,
   (f) a handle secured to said cam means for rotational movement therewith between a rest position and an actuated position corresponding to the coupling and uncoupling positions, respectively, of said locking member, said handle being manually operated from said rest position wherein said high side is engageable with the cam surface, to said actuated position wherein said low side is opposite the cam surface to provide for a movement of the locking member from the coupling position to the uncoupling position therefor,
   (g) means for biasing said handle from the actuated position to the rest position therefor, said biasing means on release of the handle from said actuated position acting to concurrently move the handle to said rest position and the high side of said cam means into engagement with said cam surface to move the locking member from said uncoupling position to the coupling position therefor, and
   (h) coacting means on and movable with said pivot means and cam means for holding the locking member in the uncoupling position therefor until after said handle has been released for movement to the rest position by said biasing means.

2. The coupler unit according to claim 1 wherein:
   (a) said coacting means comprises a generally radially extended abutment member on said cam means, and an abutment portion on said locking member,
   (b) said abutment portion, when the handle is in the actuated position and the locking member is moved toward the coupling position therefor, being engageable with the abutment member, whereby movement of the locking member from the uncoupling position therefor is restrained by the manual pressure applied on the handle in the actuated position therefor.

3. The coupler unit according to claim 1, including:
   (a) means rotatably supporting said cam means on the housing member for limited movement laterally of the axis of rotation thereof, and
   (b) an adjustable abutment member movably mounted on said housing member for engagement with said high side of the cam means,
   (c) said adjustable member, when the locking member is in the coupling position therefor, being adjustably movable into contact engagement with the high side of said cam means at a position opposite the engagement of said high side with the cam surface whereby to form with said cam means and housing member a rigid stop means for holding the locking member against rattling movement in the coupling position therefor, 4. The coupler unit according to claim 1 wherein:
   (a) said pivot means is located adjacent said opposite end of the locking member so that when the handle is in the actuated position therefor the one end of said locking member is movable to enlarge the mouth of said socket to a position defined by the engagement of said cam surface with the low side of the cam means.

5. The coupler unit according to claim 1 wherein:
   (a) said cam means includes a cylindrical shaft member rotatable about an axis parallel to the axis of said pivot means, said shaft member having end sections projected outwardly from opposite sides of the housing member, and a central section within the housing member having a flat portion to form said low side, and
   (b) said handle being of a U-shape having a base section and leg sections arranged in a straddling relation with said housing member and secured to corresponding ones of said shaft member end sections.

6. The coupler unit according to claim 5 wherein:
   (a) said leg sections, in the rest position of said handle, are inclined upwardly adjacent opposite sides of said housing member with said base section extended transversely of and engageable with the top surface of the housing member adjacent said socket portion of the housing member, and (b) said biasing means includes a torsion spring member located within the housing member and interconnected with said housing member and shaft member.

7. The coupler unit according to claim 6 wherein:
(a) said leg sections have transversely opposite openings and said housing member side walls with transversely opposite openings, all of said openings, when the handle is in the rest position, being in axial alignment, and
(b) means for releasably locking the handle in said rest position including a link member extended through said aligned openings.

References Cited
UNITED STATES PATENTS

| | | | |
|---|---|---|---|
| 2,824,754 | 2/1958 | Bolmes et al. | 280—512 |
| 2,854,256 | 9/1958 | Lamberson | 280—512 |
| 2,982,567 | 5/1961 | Bolmes | 280—512 |

LEO FRIAGLIA, Primary Examiner

R. R. SONG, Assistant Examiner